United States Patent [19]

Isogai et al.

[11] Patent Number: 4,689,691
[45] Date of Patent: Aug. 25, 1987

[54] PHOTOTELEGRAPHIC TRANSMISSION APPARATUS

[75] Inventors: Masaki Isogai, Tokyo; Yukio Nakagawa, Kawasaki, both of Japan

[73] Assignee: Nippon Kogaku K.K., Tokyo, Japan

[21] Appl. No.: 692,632

[22] Filed: Jan. 18, 1985

[30] Foreign Application Priority Data

Jan. 23, 1984 [JP] Japan ................................. 59-9708

[51] Int. Cl.$^4$ .............................................. H04N 1/40
[52] U.S. Cl. .................................. 358/280; 358/282; 358/284; 358/214; 358/80
[58] Field of Search ................. 358/214, 80, 282, 280, 358/284; 382/53

[56] References Cited

U.S. PATENT DOCUMENTS

4,418,358 11/1983 Poetsch et al. ....................... 358/80

Primary Examiner—Edward L. Coles, Sr.
Attorney, Agent, or Firm—Shapiro and Shapiro

[57] ABSTRACT

According to the phototelegraphic transmission apparatus of the present invention, the image on developed films can be directly transmitted without any prints of the film. In order to reproduce high-quality image, the apparatus comprises two gradation correction means, one of which is so designed that one of three operation modes may be selected.

5 Claims, 11 Drawing Figures

PHOTOTELEGRAPHIC TRANSMISSION APPARATUS

BACKGROUND OF THE INVENTION

1. Field of the Invention

The present invention relates to a phototelegraphic transmission apparatus and, more particularly, to a phototelegraphic transmission apparatus which performs direct photoelectric conversion of an image recorded on a film and transmits obtained electrical signals to a remote reception apparatus or an image processing computer through a telephone line or a signal line.

2. Description of the Prior Art

Conventional phototelegraphic transmission apparatuses convert enlarged prints (reflecting originals) printed from developed films into electrical signals, and transmit these electrical signals through a telephone line.

SUMMARY OF THE INVENTION

It is an object of the present invention to provide a phototelegraphic transmission apparatus which can transmit high-quality image signals of optimal gradation from developed transparent negatives or positives of different types or of different exposure conditions during photography.

In order to achieve the above object of the present invention, an optical image obtained by light transmitted through an image-bearing film is Photoelectrically converted by a photosensor element. A photoelectric conversion output is subjected to analog gamma correction and then to A/D conversion. Thereafter, the output is subjected to digital gamma correction by referring to a look-up table or the like stored in a RAM.

DETAILED DESCRIPTION OF THE PREFERRED EMBODIMENTS

Figure 1:
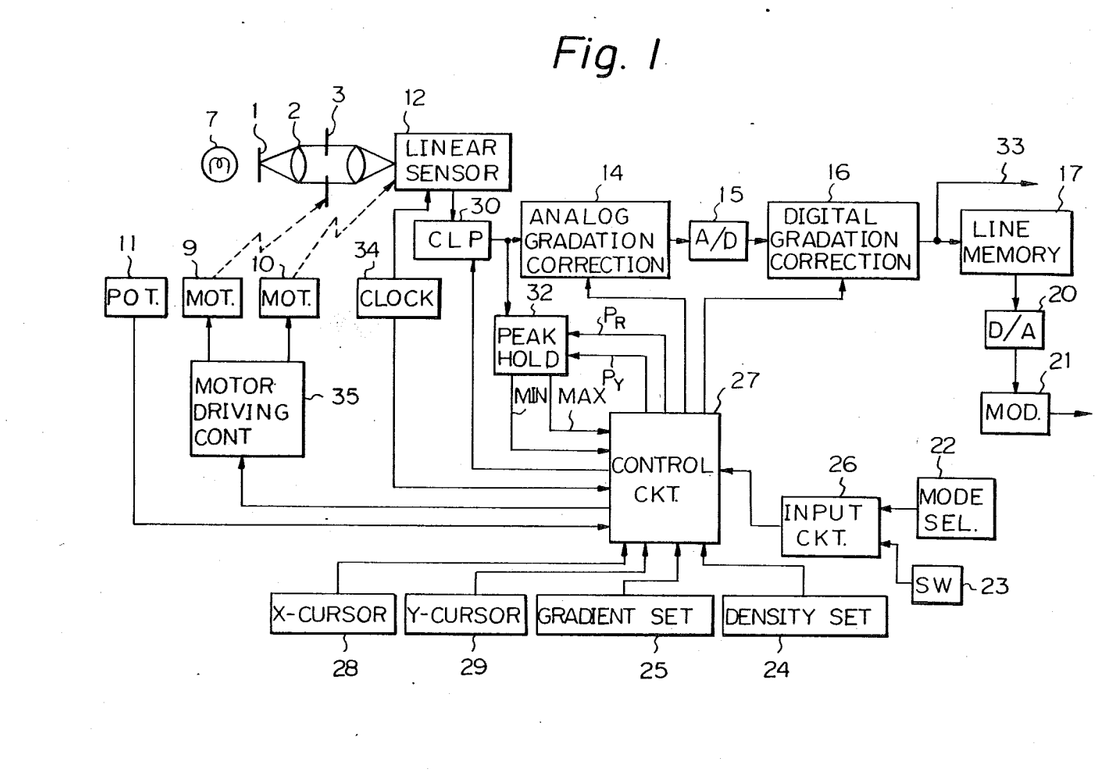
FIG. 1 is a block diagram of an embodiment of the present invention.

FIG. 1 shows an embodiment of the present invention. A film 1 is a developed film as an object of phototelegraphy which can transmit light, i.e., a transparent positive or negative (to be simply referred to as a film hereinafter). An imaging optical system 2 forms an image of the film 1 on an imaging surface of a photosensor element. A diagram 3 is driven by a diagram motor 9 to control the brightness of the image. An illumination system 7 illuminates the rear surface of the film 1. A linear sensor 12 is moved by a linear sensor motor 10 in a direction perpendicular to its longitudinal direction to convert the image on the film 1 formed by the imaging optical system 2 into electrical signals. Instead of the linear sensor 12, the film 1 can be moved. However, if the film 1 is moved, its moving speed must be changed when the imaging magnification of the optical system 2 is changed. This results in complex control procedures. An analog gradation correction circuit 14 corrects the gradation of an analog video signal supplied from the linear sensor 12 and comprises an amplifier which allows selection of linear or nonlinear amplification characteristics. An A/D converter 15 converts an analog video signal which has been analog-gradation corrected into a digital video signal.

A digital gradation correction circuit 16 corrects the gradation of the digital video signal.

A line memory 17 has an address terminal and data input/output terminals and temporarily stores the digital video signal which has been subjected to digital gradation correction.

Figure 8:
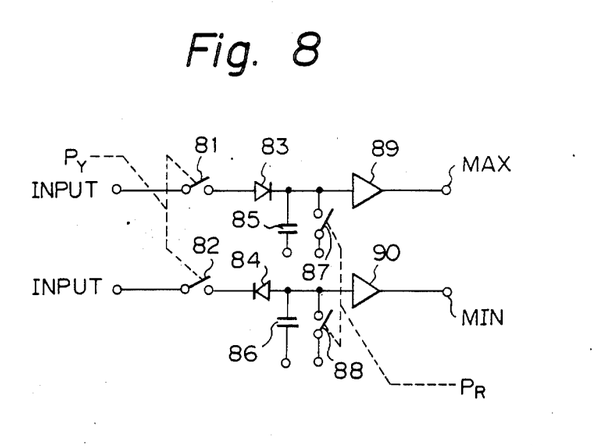
FIG. 8 is a circuit diagram of an embodiment of a peak hold circuit.

A D/A converter 20 converts the composite video signal into an analog signal. A modulator 21 modulates the input signal for phototelegraphic transmission. A signal from a potentiometer 11 interlocked with the opening/closing operation of the diagram 3 is supplied to a control circuit 27 for controlling the transmission apparatus. A mode selector 22 for selecting the digital gradation correction mode can select one among three of auto, correction, and cursor modes. A switch 23 is operated according to whether the film 1 is a positive or a negative. A density set device 24 is operated in the correction mode to set the overall density level of an image to be transmitted. A gradient set device 25 is also operated in the correction mode to change the correction characteristics of the digital gradation correction circuit 16, i.e., the gamma characteristics so that the optimal image contrast is obtained. An input circuit 26 supplies signals received from the mode selector 22 and the switch 23 to the control circuit 27. 28 and 29 are X- and Y-cursor operating devices in the cursor mode. An X-cursor operating device 29 corresponds to a light-emitting element 45 and a light-receiving element 46 of a photocoupler to be described later with respect to FIG. 4. A Y-cursor operating device 29 has a potentiometer which is interlocked with movement of the Y-cursor. An output signal from this potentiometer is also supplied to the control circuit 27. A clamp level of a claim circuit 30 is controlled by the control circuit 27. A peak hold circuit 32 stores the maximum and minimum values of the output signals from the linear sensor 12 and supplies these values to the control circuit 27. A digital video signal line 33 transmits an output from the digital gradation correction circuit 16 to an image processing computer or the like. A clock generator 34 supplies clock signals to the linear sensor 12 and the line memory 17. A motor drive control circuit 35 is controlled by the control circuit 27 to control the drive operation of an original feed motor (not shown) diagram control motor 9, and linear sensor moving motor 10. In an apparatus which directly converts a transparent positive or negative into electrical signals and transmits the obtained electrical signals to obtain a high-quality image, determining an exposure (i.e., determining an optimal exposure of a transparent positive or negative) and gradation correction are major problems. In order to solve these problems, prescanning prior to phototelegraphic transmission is performed. This will be described in more detail below. When a prescan start switch (not shown) is depressed, prescanning is started. Note that the diagram 3 is stopped down prior to prescanning so that the linear sensor 12 will not saturate for a bright object. When prescanning is started, the peak hold circuit 32 begins operating. As shown in FIG. 8, the peak hold circuit 32 consists of maximum and minimum value detecting circuits. An output from the peak hold circuit 32 is supplied to the control circuit 27.

Prescanning is reciprocally performed of a scanning image. The control circuit 27 determines the setting value of the diagram 3 in accordance with an output from the peak hold circuit representing the maximum value obtained after forward prescanning is performed. The setting value determined by the control circuit 27 is supplied to the motor control drive circuit 35. The state of the diagram 3 is supplied to the control circuit 27 through the potentiometer 11.

When the diagram 3 is set in this manner, reverse prescanning is started. In accordance with an output from the peak hold circuit representing a minimum value obtained after reverse prescanning, the control circuit 27 determines a clamp voltage of the clamp circuit 30 with which the minimum level of the output from the linear sensor 12 becomes a reference level (e.g., 0 volts). The control circuit 27 supplies the determined clamp voltage to the clamp circuit 30. Therefore, when the clamp voltage is suitably changed, the minimum value of the outputs from the linear sensor 12 which corresponds to the darkest video portion of the film 1 is set to be equal to the minimum value of the input range of the A/D converter 15.

The control circuit 27 further performs fine control of the diagram 3 in accordance with the output voltage from the maximum value detecting circuit.

Figure 2A:
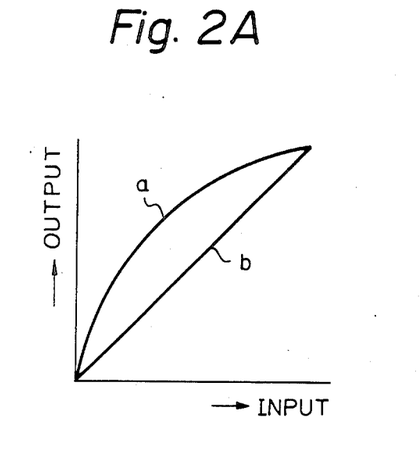
FIG. 2A is a graph showing analog gradation correction characteristics.
Figure 2B:
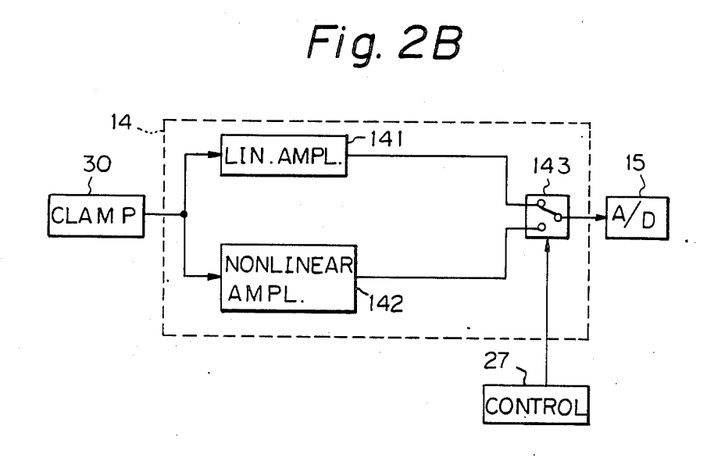
FIG. 2B is a block diagram of an analog gradation correction circuit.

When reciprocal prescanning is performed in this manner, the maximum and minimum values of the output signals from the linear sensor 12 are set to coincide with the input range of the A/D converter 15. Prescanning is performed at a speed higher than that of scanning for phototelegraphic transmission. As shown in FIGS. 2A and 2B, the analog gradation correction circuit 14 operates differently according to whether the film 1 is a positive or a negative. The analog gradation correction circuit 14 consists of a linear amplifier 141, a nonlinear amplifier 142, and a switching circuit 143. When a negative is selected by the switch 23, the switching circuit 143 transfers an output from the nonlinear amplifier to the A/D converter 15. When a positive is selected by the switch 23, the switching circuit 143 supplies an output from the linear amplifier 141 to the A/D converter 15.

FIG. 2A is a graph showing the correction characteristics of the analog gradation correction circuit. In the case of a negative, information is concentrated at the low density portion. As a result, characteristics represented by characteristic curve a are preferably selected wherein an amplification gain is high at a low output voltage level of the linear sensor. A similar effect can be obtained to a certain degree by the digital gradation correction circuit after A/D conversion. However, if the gradient of a correction characteristic curve of digital gradation correction is set to be too high, gradation level skipping occurs which causes the formation of a pseudo edge line.

In view of this problem, satisfactory gradation correction can be obtained by performing analog gradation correction first and then digital gradation correction.

When the film 1 is a positive, the positive can be viewed without any modification and does not require much gradation correction. For this reason, the amplifier constituting the analog gradation correction circuit 14 can have a linear characteristic as indicated by a line b in FIG. 2A. When some gradation correction is required, it can be performed by the digital gradation correction circuit 16.

By setting the diagram 3 and by setting the clamp voltage (or setting the amplifier off), each of maximum and minimum values of the video signal is set to coincide with a corresponding end of input the range of the A/D converter. These maximum and minimum values are converted to digital signals which are supplied to the digital gradation correction circuit 16 to be subjected to final gradation correction. Signal inversion is digitally performed according to whether the film 1 is a positive or a negative.

One of three modes for determining the characteristics of the gradation correction circuit is selected by the mode selector 22. When the film 1 is a positive, gradation can be visually checked and correction is easy. Therefore, gradation correction presents a problem only in the case of a negative, and the following description will be made only with reference to a case wherein the film 1 is a negative.

Figure 3A:
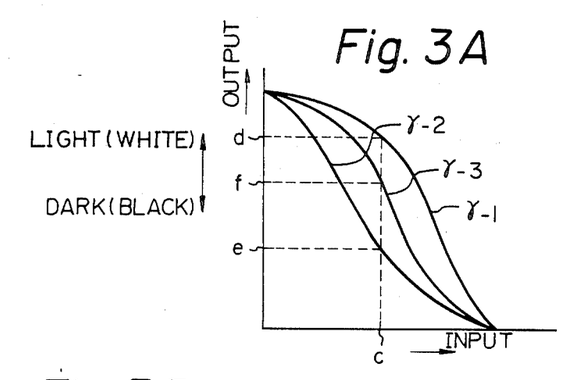
FIG. 3A is a graph showing digital gradation correction characteristics.

The gradation characteristics of a negative vary widely in accordance with exposure and developing conditions. In order to determine the characteristics of the digital gradation correction circuit (to be referred to as a gradation correction curve), two parameters must be set. One parameter concerns the final density at which a specific video signal is reproduced. The other parameter relates to the gradient of a gradation correction curve near the specific video signal input level, i.e., contrast information. These two parameters will be referred to as density and gradient information hereinafter. FIG. 3A is a graph showing the digital gradation correction characteristic curve. The level of an input video signal indicated by reference symbol c corresponds to density d in accordance with a gradation correction curve $\gamma-1$ and to density e in accordance with a gradation correction curve $\gamma-2$. The density is lighter in the upper side along the axis of ordinate (white in a monochromatic film). Thus, the density is lighter at point d than at point e.

In the vicinity of point c, the curve $\gamma-1$ has a smaller gradient than that of the curve $\gamma-2$. This means that with the curve $\gamma-1$ the information at point c is reproduced lighter and the density change in the vicinity of point c is moderate compared to the curve $\gamma-2$.

When the curves $\gamma-1$ and $\gamma-2$ have negative gradients, i.e., when the video signal level is small, the reproduced density is white in the case of a negative. The curves $\gamma-1$ and $\gamma-2$ have positive gradients in the case of a positive.

Figures 3B, 4:
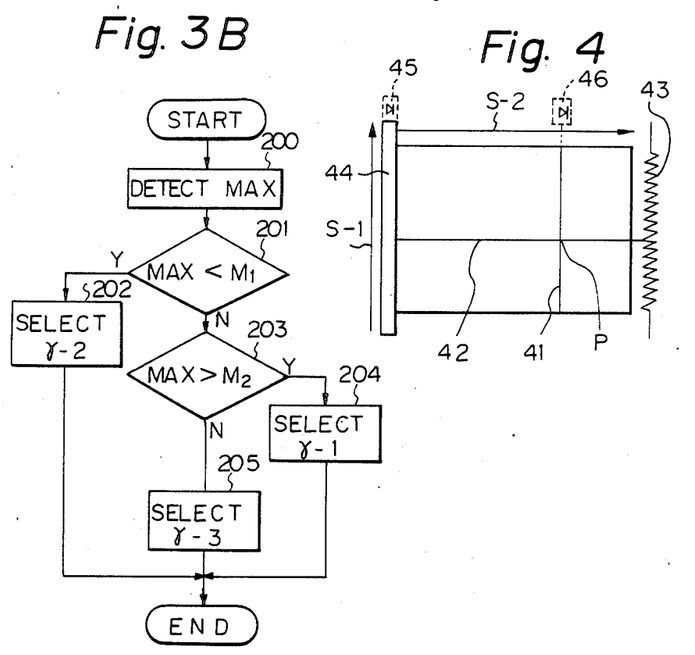
FIG. 3B is a flow chart of digital gradation correction.
FIG. 4 is a representation showing the relationship between cursors and a transmission image.

As has been described above, three modes consisting of auto, correction and cursor modes are available for determining the characteristics of the digital gradation correction circuit. With these three modes, an image on any type of film can be transmitted satisfactorily. The first or auto mode is a completely automatic mode wherein the gradation difference which is caused by differences in the exposure or developing conditions is automatically corrected by the control circuit 27. The control circuit 27 determines and corrects the gradation of a transparent negative of an object in accordance with the maximum and minimum values detected by the peak hold circuit during prescanning. FIG. 3B shows a flow chart of this operation. In step 200, a maximum value MAX is detected. In step 201, the maximum value MAX is compared with a predetermined value M1. When the value MAX is smaller than the value M1 (the lightest portion is dark) and the diaphragm must be opened widely, the film is an overexposed negative. Therefore, information is concentrated at a low level range of the linear sensor 12. The control circuit 27 performs processing so as to match the digital gradation correction curve with an overexposed negative. In step 202, therefore the correction curve $\gamma-2$ is selected. In step 203, the maximum value MAX is compared with a predetermined value M2 (M2>M1). When the maximum value MAX is larger than M2 and the diaphragm need not be opened widely, the film is an underexposed negative. In this case, information is concentrated at a high level range of the linear sensor 12. The control circuit 27 selects the characteristics of the gradation correction circuit which are suitable for an underexposed negative. In step 204, therefore, the correction curve $\gamma-1$ in FIG. 3A is selected. If $M1<MAX<M2$, the curve $\gamma-3$ is selected in step 205. In the auto mode, the characteristics of the digital gradation correction circuit 16 are automatically determined as has been described above. In the second or correction mode, the characteristics of the digital gradation correction circuit which are determined in the auto mode are intentionally changed. The density set device 24 and the gradient set device 25 are used to determine the degree of change in the characteristics. When these devices 24 and 25 are properly set, the contrast or gradient of the characteristic curve of the digital gradation correction circuit 16 can be determined and the degree of change in the overall density (on the received image) to the white or black side can also be determined.

In the correction mode, the density set device 24 and the gradient set device 25 provide a relative standard for changing the gradation characteristics to be set in the auto mode.

In the third or cursor mode, a desired point on the scanning image is designated by X- and Y-cursors shown in FIG. 4 so as to set the density and gradient with the devices 24 and 25 and to determine the overall gradation correction. FIG. 4 is a representation showing the relationship between the cursors and the transmission image in order to explain the cursor mode. When the cursor mode is selected, one reciprocal prescanning operation for determining the diaphragm value and the clamp voltage is performed and thereafter another reciprocal prescanning operation is performed. During the second reciprocal prescanning, after the diaphragm value and the clamp voltage are set, the level of a video signal of a limited region including a point P at an intersection of the X- and Y-cursors is fetched by the control circuit 27.

Referring to FIG. 4, the position of a Y-cursor 42 is supplied as a voltage to the control circuit 27 by a potentiometer 43 of the operation device 29 interlocked with the Y-cursor 42. The position of an X-cursor 41 is detected by a photocoupler. The photocoupler consists of a light-emitting element 45 such as an LED which is mounted on a sensor block 44 having the linear sensor 12, and a light-receiving element 46 such as a photodiode which is mounted on the X-cursor. When the linear sensor 12 coincides with the set position of the X-cursor 41, the photocoupler sends a signal indicating this to the control circuit 27.

In a description to follow, scanning by the linear sensor 12 moved by the motor 10 in a direction of an arrow S-1 will be referred to as main scanning, and scanning by the linear sensor 12 in a direction of an arrow S-2 in response to clocks from the clock generator 34 will be referred to as sub scanning. The positions of the X- and Y-cursors determine the position of the intersection point P. A signal of the cursor set point P can be inputted by the peak hold circuit. After the second prescanning operation has been started, the control circuit 27 sets the peak hold circuit in the reset state up to a point near the cursor set point P. When both the main and sub scanning positions reach a point near the cursor set point P, the peak hold circuit is operated so as to input the video signal level near the cursor set point P.

In FIG. 4, the arrow S-1 indicates a direction along which the linear sensor 12 mounted on the sensor block 44 is moved by the motor 10, and the arrow S-2 indicates a direction along which the linear sensor 12 scans in response to the clocks from the clock generator 34. When the video signal level near the cursor set point P is inputted and the preset values of the density set device 24 and the gradient set device 25 (the device 25 is for determining the contrast) are determined, the control circuit 27 sets, in the RAM 16, the digital gradation characteristics which set the video signal level near the cursor set point P at the preset density and also set the contrast at the set contrast. For example, curve $\gamma-3$ is obtained when the video signal level at the cursor set point P corresponds to c in FIG. 3A, the output density set by the density set device 24 is f, and the gradient information set by the gradient set device 25 is larger than that of the curve $\gamma-2$.

The cursor mode is a mode for externally designating the density and gradient information.

In this manner, the signal which has been subjected to analog gradation correction at a first stage and then to digital gradation correction in one of three modes at a second stage is written in the line memory 17. The memory 17 is for band conversion so as to convert the relatively high-speed signal of the linear sensor 12 into relatively low-speed signals equivialent to those of a conventional telephotographic transmission apparatus using a telephone line. The video signal band-converted by the line memory 17 is modulated by the modulator 21 through the D/A converter 20. The digital video signal line 33 transfers a high-speed digital video output.

Figures 5, 5A:
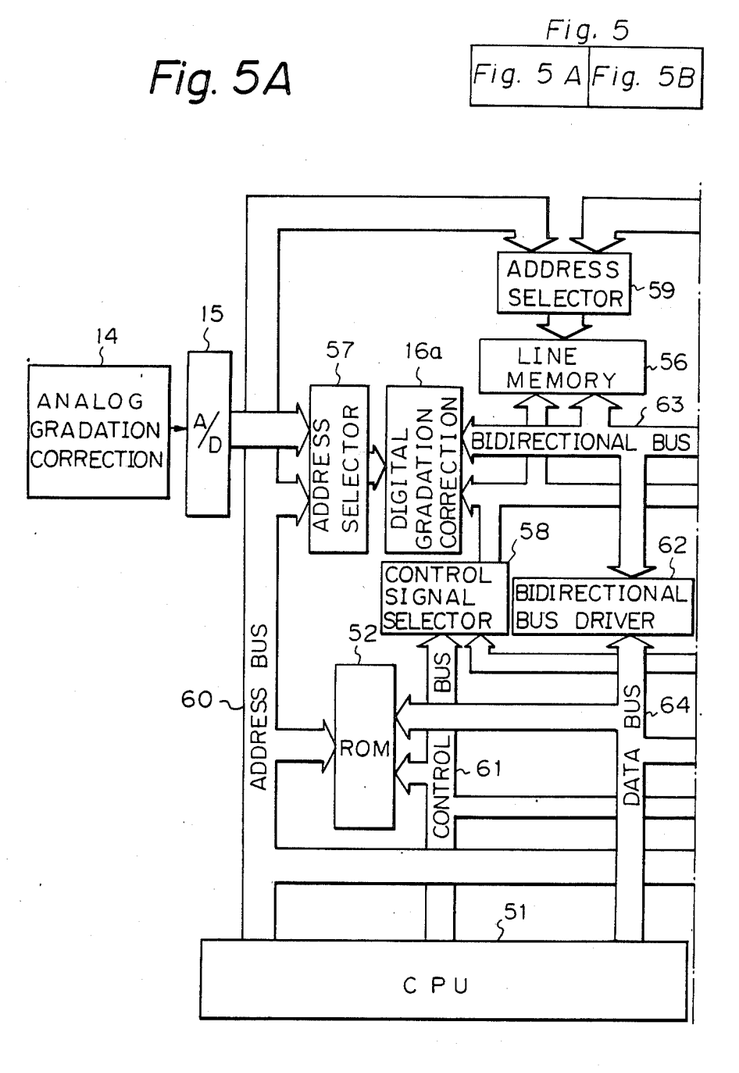
FIGS. 5A-B are block diagrams of an embodiment wherein a control circuit comprises a microcomputer.
Figure 5B:
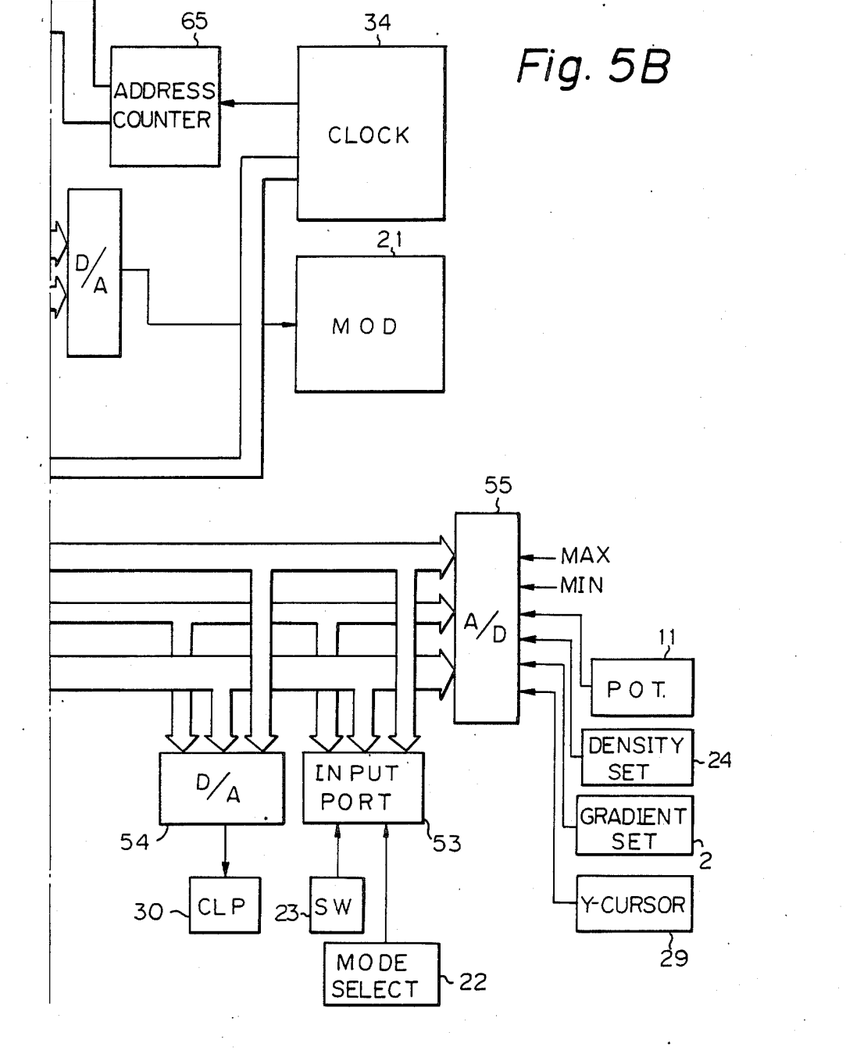

FIG. 5 is a block diagram of an embodiment wherein the control circuit 27 comprises a microcomputer. The same reference numerals as in FIG. 1 denote the same parts in FIG. 5. A ROM 52 stores a program to operate a CPU 51 as a control circuit. An input port 53 corresponds to the switch input circuit 26 shown in FIG. 1.

An output of a D/A converter 54 is connected to the clamp circuit 30 shown in FIG. 1 so as to supply a clamp voltage thereto. An A/D converter 55 has a 6-channel analog multiplexer which receives six signals, i.e., an output from the potentiometer 11 interlocked with the diaphragm 3 shown in FIG. 1, the maximum and minimum values detected by the peak hold circuit 32, an output from the density set device 24, an output from the gradient set device 25, and an output from the Y-cursor operation device 29. The clock generator 34 generates clocks for read/write control with respect to a line memory 56. A digital gradation correction circuit 16a comprises a RAM. In normal operation, an address selector 57 is switched to correct the gradation of an output signal from the A/D converter 15. The RAM of the digital gradation correction circuit 16a stores a lookup table. With this arrangesent, a large number of correction characteristics can be obtained with a small memory capacity. When any of the three modes consisting of auto, correction and cursor modes can be selected for digital gradation correction and the digital gradation correction circuit 16a comprises a ROM (read-only memory), the memory capacity must be increased in proportion to an increase in the number of correction characteristic sets to be prepared. This means that a ROM having a very large capacity must be used. In view of this problem, in this embodiment, the digital gradation correction circuit 16a comprises a RAM.

A data bus 64 is connected to the CPU 51, and an address counter 65 is connected to the clock generator 34. Only when the CPU 51 accesses the digital gradation correction circuit 16a or the line memory 56, selectors 57, 58 and 59 are switched to an address bus 60 or a control bus 61. Only when the CPU 51 accesses the digital gradation correction circuit 16a, the line memory 56 or the D/A converter 20, bidirectional bus driver 62 allows data exchange through a bidirectional bus 63. Otherwise, the bidirectional bus driver 61 does not allow data exchange between the CPU 51 and the correction circuit 16a, the line memory 56 and the D/A converter 20.

With this arrangement, the RAM constituting the digital gradation correction circuit 16a and the memory for the line memory 56 can be used for calculation of the gradation curve in accordance with information obtained by prescanning, the digital gradation correction curve set mode and density information, and the gradient information, A separate memory used only for this purpose need not be incorporated.

The cursor mode will now be described. In this mode, the density of the film in a narrow region near the point at the intersection of the X- and Y-cursors is measured, and the density of this region and the gradient of the γ-characteristic curve are designated by a microcomputer.

Figure 6:
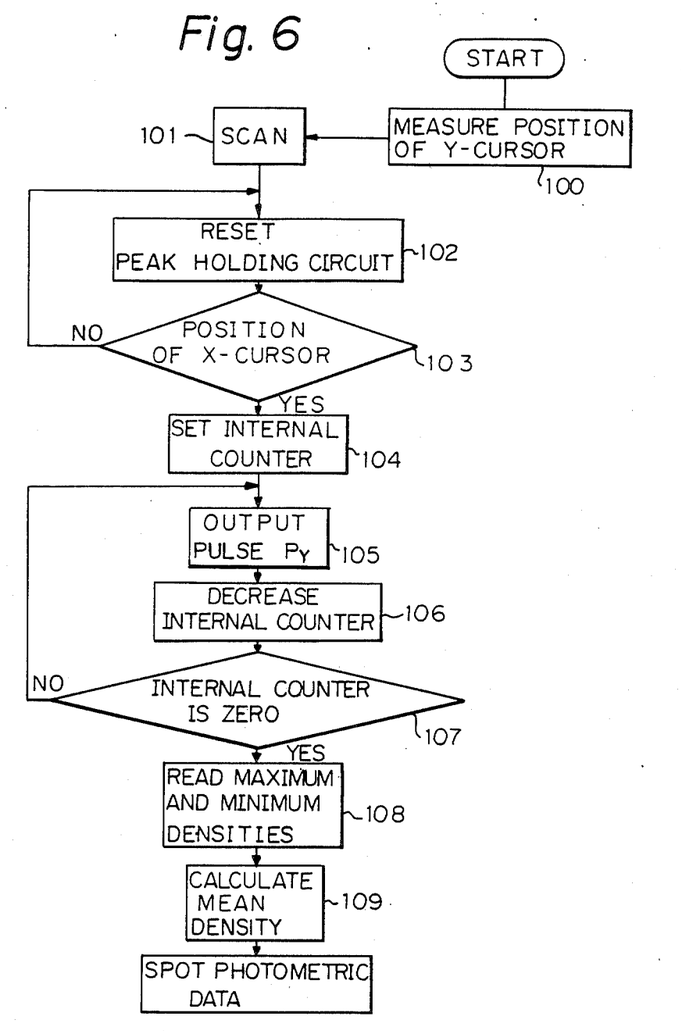
FIG. 6 is a flow chart in a cursor mode.

FIG. 6 is a flow chart of the cursor mode.

In step 100, the position of the Y-cursor is measured by the potentiometer 43. In step 101, scanning by the line sensor 12 is started. In steps 102 and 103, resetting of the peak hold circuit 32 is repeated by a pulse PR until the line sensor reaches the X-cursor position. In step 104, when the line sensor reaches the X-cursor position, the CPU 51 sets the count value corresponding to the sub scanning time (the number of main scanning lines corresponding to the width along the X-direction) in the internal counter. In step 105, a pulse PY of a predetermined duration is produced at the Y-cursor position along the main scanning direction. Peak hold is performed only during this pulse duration. In step 106, the internal counter set in step 104 is decremented by 1. In step 107, when the counter reaches 0, that is, when sub scanning has been performed for a predetermined period of time, the maximum and minimum densities are read in step 108. In step 109, the operation (maximum density+minimum density)/2 is performed to calculate the mean density at the spot portion.

Figure 7:
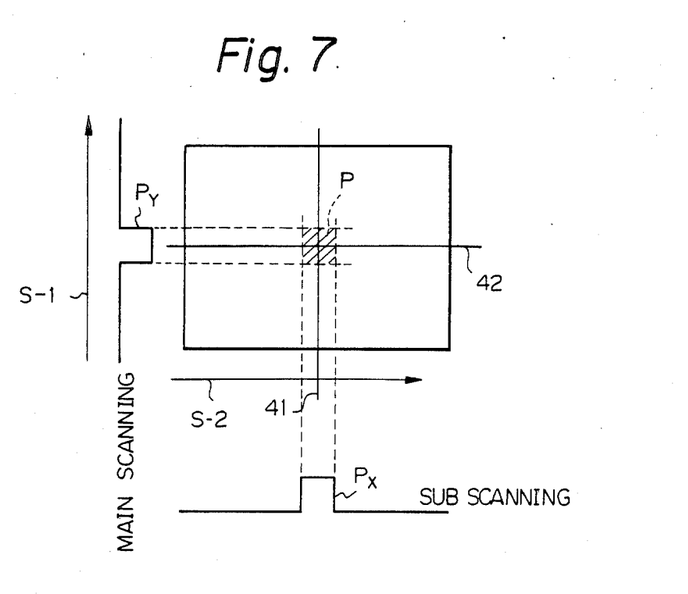
FIG. 7 is a representation for explaining photometering operation at an intersection of cursors.

FIG. 7 is a representation showing the portion which is subjected to spot photometering and corresponds to the intersection point P of the X- and Y-cursors in the transmission image of the film. The pulse PX in the sub scanning direction has a duration which is determined by the counter setting in step 104 and corresponds to the read time of the line sensor output. The pulse PY in the main scanning direction has a constant duration and is generated by Y-cursor position detection. The duration of the pulse PY corresponds to the peak hold operation of the line sensor output in the main scanning direction.

The operator moves the X- and Y-cursors to set the point P at a desired point while viewing a transmission image on a viewfinder (not shown) guided through a movable reflecting mirror (not shown) arranged in front of the linear sensor 12. When the X- and Y-cursors 41 and 42 comprise colored transparent resin plates having widths corresponding to the duration of the pulses PX and PY and black lines at their centers along the longitudinal directions, the operator can easily view the photometric range.

FIG. 8 is a circuit diagram of an embodiment of the peak hold circuit 32. Switches 81 and 82 are turned on only when the main scanning pulse PY is enabled. The circuit has diodes 83 and 84, capacitors 85 and 86, reset switches 87 and 88, and buffer amplifiers 89 and 90. The switches 87 and 88 are controlled by a reset pulse PR.

During the scanning operation of the line sensor 12, at image portions other than the set portion of the X-cursor 41, the reset switches 87 and 88 are closed and the capacitors 85 and 86 are not charged. Since the switches 81 and 82 are turned on only when the main scanning pulse PY is enabled, the switches 81 and 82 are turned on and the switches 87 and 88 are turned off at the point P. Thus, the peak hold operation is performed and the maximum and minimum densities are fetched by the microcomputer. The microcomputer calculates the mean value of the maximum and minimum densities so as to determine the mean density at the point P.

We claim:

1. An apparatus for generating an image signal of a developed film, including:
   (a) means for forming an image of the film on a predetermined plane;
   (b) means for scanning the image of the film which is formed on the predetermined plane and for generating an analog signal representing the image of the film;
   (c) first correcting means for correcting the analog signal so as to change a gradation of the image of the film which is represented by the analog signal, said first correcting means including a linear amplifier, and a nonlinear amplifier which is connected in parallel with said linear amplifier;
   (d) means for converting the analog signal which has been corrected by said first correcting means into a digital signal; and
   (e) second correcting means for correcting the digital signal so as to change a gradation of the image of the film which is represented by the digital signal.

2. An apparatus according to claim 1, further including a member to be operated so as to control said second correcting means.

3. An apparatus according to claim 1, further including:
   means for setting a predetermined range of the image of the film; and
   means for detecting maximum and minimum values of the analog signal within the predetermined range.

4. An apparatus according to claim 1, wherein said first correcting means includes selection means for selecting one of said linear amplifier and said nonlinear amplifier, and said selected one of said linear amplifier and said nonlinear amplifier amplifies the analog signal.

5. An apparatus for generating an image signal of a developed film, including:
(a) means for forming an image of the film on a predetermined plane;
(b) means for scanning the image of the film which is formed on the predetermined plane and for generating an analog signal representing the image of the film;
(c) first correcting means for correcting the analog signal so as to change a gradation of the image of the film which is represented by the analog signal;
(d) means for converting the analog signal which has been corrected by said first correcting means into a digital signal;
(e) second correcting means for correcting the digital signal so as to change a gradation of the image of the film which is represented by the digital signal;
(f) means for detecting maximum and minimum values of the analog signal; and
(g) means for controlling said second correcting means in accordance with the maximum and minimum values detected by said detecting means.

* * * * *